(12) United States Patent
Surowinski et al.

(10) Patent No.: US 9,732,765 B2
(45) Date of Patent: Aug. 15, 2017

(54) WATER-COOLED ELECTRONIC INVERTER

(71) Applicant: Hayward Industries, Inc., Elizabeth, NJ (US)

(72) Inventors: Steve Surowinski, Warwick, RI (US); Jason Wayne Parcell, Winston-Salem, NC (US)

(73) Assignee: Hayward Industries, Inc., Elizabeth, NJ (US)

( * ) Notice: Subject to any disclaimer, the term of this patent is extended or adjusted under 35 U.S.C. 154(b) by 234 days.

(21) Appl. No.: 14/734,577

(22) Filed: Jun. 9, 2015

(65) Prior Publication Data
US 2015/0361991 A1    Dec. 17, 2015

Related U.S. Application Data

(60) Provisional application No. 62/013,107, filed on Jun. 17, 2014.

(51) Int. Cl.
| *F04D 1/00* | (2006.01) |
| *F04D 13/06* | (2006.01) |
| *F04D 29/08* | (2006.01) |
| *F04D 29/22* | (2006.01) |
| *F04D 29/58* | (2006.01) |

(Continued)

(52) U.S. Cl.
CPC ..... *F04D 29/5813* (2013.01); *F04D 13/0686* (2013.01); *F04D 29/086* (2013.01); *H02K 11/33* (2016.01)

(58) Field of Classification Search
CPC .......... F04D 1/00; F04D 13/06; F04D 29/086; F04D 29/22; F04D 29/5813; H02K 11/33; H05K 7/20272; H05K 7/20927
See application file for complete search history.

(56) References Cited

U.S. PATENT DOCUMENTS

| 3,195,035 A | * | 7/1965 | Sudmeier | ............ H02P 29/0027 310/104 |
| 4,109,920 A | * | 8/1978 | Wiese | .................. F16J 15/3404 165/104.31 |
| 5,484,267 A | | 1/1996 | Rockwood | |

(Continued)

FOREIGN PATENT DOCUMENTS

EP          1 211 784 A1      6/2002

OTHER PUBLICATIONS

International Search Report of the International Searching Authority mailed on Aug. 21, 2015, issued in connection with International Application No. PCT/US2015/034871, corresponding to U.S. Appl. No. 14/734,577 (3 pages).

(Continued)

*Primary Examiner* — Igor Kershteyn
(74) *Attorney, Agent, or Firm* — McCarter & English, LLP

(57) ABSTRACT

A water cooled inverter is disclosed herein. More specifically, disclosed is a water cooled inverter for attachment to a water pump housing that defines a water chamber therewithin, the water cooled inverter comprising a pump seal plate, including a sealing wall that has a pump seal plate aperture therethrough, the pump seal plate aperture configured to receive a motor shaft to allow an impeller coupled to the motor shaft to propel water within the water chamber, and an inverter assembly, wherein the pump seal plate thermally couples the inverter assembly to the water chamber.

17 Claims, 14 Drawing Sheets

(51) Int. Cl.
*H05K 7/20* (2006.01)
*H02K 11/33* (2016.01)

(56) References Cited

U.S. PATENT DOCUMENTS

| 8,602,745 B2 * | 12/2013 | Stiles, Jr. ............... | F04B 49/20 |
| | | | 417/44.11 |
| 2005/0095150 A1 | 5/2005 | Leone et al. | |
| 2013/0315720 A1 | 11/2013 | Smal et al. | |

OTHER PUBLICATIONS

Written Opinion mailed on Aug. 21, 2015, issued in connection with International Application No. PCT/US2015/034871, corresponding to U.S. Appl. No. 14/734,577 (4 pages).

* cited by examiner

WATER-COOLED ELECTRONIC INVERTER

CROSS-REFERENCE TO RELATED APPLICATIONS

The present application claims priority to U.S. Provisional Patent Application No. 62/013,107 filed Jun. 17, 2014, the disclosure of which is incorporated herein by reference in its entirety for all purposes.

BACKGROUND

1. Technical Field

This invention relates to electric water pumps, and more particularly, to a water cooled electronic inverter for use in electric water pumps.

2. Background Art

FIGS. 1-4 show a pumping assembly 10 that is prior art as compared to the present application. The pumping assembly 10 is configured to be connected to a fluid circulation line of a swimming pool and/or other recreational body of water, such as a spa, etc. The pumping assembly 10 is typically connected to the fluid circulation line so as to pump dirty water for filtration and return clean water. Other devices might be connected along the fluid circulation line, such as sand filters, chlorinators, and other devices known in the art.

Referring to FIG. 1, the pumping assembly 10 includes a pump 12, a sealing plate 14, a motor 16, and a drive assembly 18. The pump 12 includes an inlet 20 for directing fluid from the fluid circulation line to a water chamber 24, and an outlet 22 for discharging the fluid from the water chamber 24 to the fluid connection line. The water chamber 24 includes a strainer basket for filtering water that flows into a chamber via the inlet 20. The motor 16 includes a shaft that protrudes into the water chamber 24, where the shaft drives an impeller (not shown) to pump fluids from the inlet 20, through the water chamber 24, and out the outlet 22. The sealing plate 14 blocks the water chamber 24 and has a through hole 26 to accommodate the motor shaft so that the motor 16 can drive the impeller within the water chamber 24. A fan shroud 30 is provided to cover one end of the motor 16. A base 32 is provided under the pump 12 and the motor 16 for providing stability thereto.

The drive assembly 18 is situated on an outer surface of the motor body. As shown in FIG. 2, the drive assembly 18 includes a housing 34 that encapsulates a first printed circuit board assembly 36 and a second printed circuit board assembly 38, which are in electrical communication with the motor 16. As shown, the first and second printed circuit board assemblies 36, 38 have polygonal shapes.

In the prior art, it is also known to cool an inverter by use of an external waterway bypass embedded into an inverter heatsink design to remove heat from power components. In these prior art systems, the pump in/out pressure difference is usually sufficient to achieve water flow required for cooling. In the prior art, it is also known to include a heat sink for allowing heat to be dissipated away from the printed circuit board assemblies. In operation, the prior art heat sink relies on water to flow through a space between the housing and the motor body.

In electronic water pump assemblies, electronic inverters having water cooling means are known in the art. In a typical electric water pump assembly, an electronic inverter converts main power supply into multiple phase output voltage, which is used by an electric pump to propel water, for example, to direct the water through a filtering and conditioning system. The electronic inverter is based on a printed circuit board that contains several electronic components. During inverter operations, heat is produced by the electronic components and must be dissipated to avoid inverter failure. In order to dissipate such heat, a pump assembly can include a water based cooling system that uses a dedicated water bypass. The dedicated water bypass diverts a portion of the pumped water into a manifold heatsink, where the diverted water removes the heat produced by the inverter electrical components.

These cooling systems, however, have several major disadvantages. First, operation of many of these cooling systems is based on water differential pressure created by running the pump. When the pump slows down, the operation decreases rapidly, thereby reducing cooling performance. Second, in these systems, the dedicated bypass is formed using additional waterways, which not only decrease overall pump efficiency due to reduction of differential pressure, but are also subject to failure as debris in the water may clog the manifold heatsink. Thus, these systems offer limited product reliability, as the narrower waterway paths may become clogged. Third, the mechanical design of these systems require more material to be used, as designated water pathways can require additional part machining processes and increase enclosure envelopes. These systems often include provisions for water bypass, as well a specially designed manifold heatsink that can ensure a perfect seal between the working inverter electronics and the water. Also, these systems involve the use of additional plumbing accessories, for example, to couple water flow between the pump and the heatsink. Thus, the cost of these systems is high. Fourth, these systems often require substantial manufacturing assembly effort, as well as burdensome maintenance and upkeep.

SUMMARY OF THE INVENTION

The present invention overcomes the disadvantages and shortcomings of the prior art by providing an improved water pump assembly including a water cooled inverter.

In preferred embodiments, the water pump assembly includes a pump seal plate that serves as a heatsink to transfer heat from the inverter electrical components to water within the water chamber. The pump seal plate is made of a thermally conductive material, and has a first surface that houses the inverter printed circuit board assembly and a second surface that contacts the water within the water chamber. The pump seal plate also creates a watertight seal between the inverter electrical components and the water within the water chamber. Thus, the water cooled inverter transfers heat from the inverter electrical components to the water, while protecting the inverter electrical components from water damage.

Some embodiments achieve heat dissipation by the use of a pump seal plate, which primarily functions to separate the electric motor from the wet-end part of the pump, as a heatsink to transfer heat from the inverter to the water. Some embodiments comprise a cooling design method which does not use dedicated waterways, and thus does not cause pump performance decrease. In some embodiments, there is no manifold which would get clogged, nor seals which could leak in time. Some embodiments use a direct water cooling method where the inverter is thermally coupled to the pump manifold, which is an integral part of the pump and acts as a separator between wet-end and the electric motor. Said manifold is made from thermally conductive material, such as aluminum, which enables using it as a heatsink. In some embodiments, the motor faceplate is coupled directly with the wet end and sealed off by the manifold. The wet-end is based on a centrifugal pump style where the impeller rotates directly off the motor shaft.

Additional features, functions and benefits of the disclosed water cooled inverter and methods in connection therewith will be apparent from the detailed description which follows, particularly when read in conjunction with the accompanying figures.

BRIEF DESCRIPTION OF THE DRAWINGS

For a more complete understanding of the present invention, reference is made to the following detailed description of an exemplary embodiment considered in conjunction with the accompanying drawings, in which.

DETAILED DESCRIPTION OF THE DRAWINGS

Figure 1:
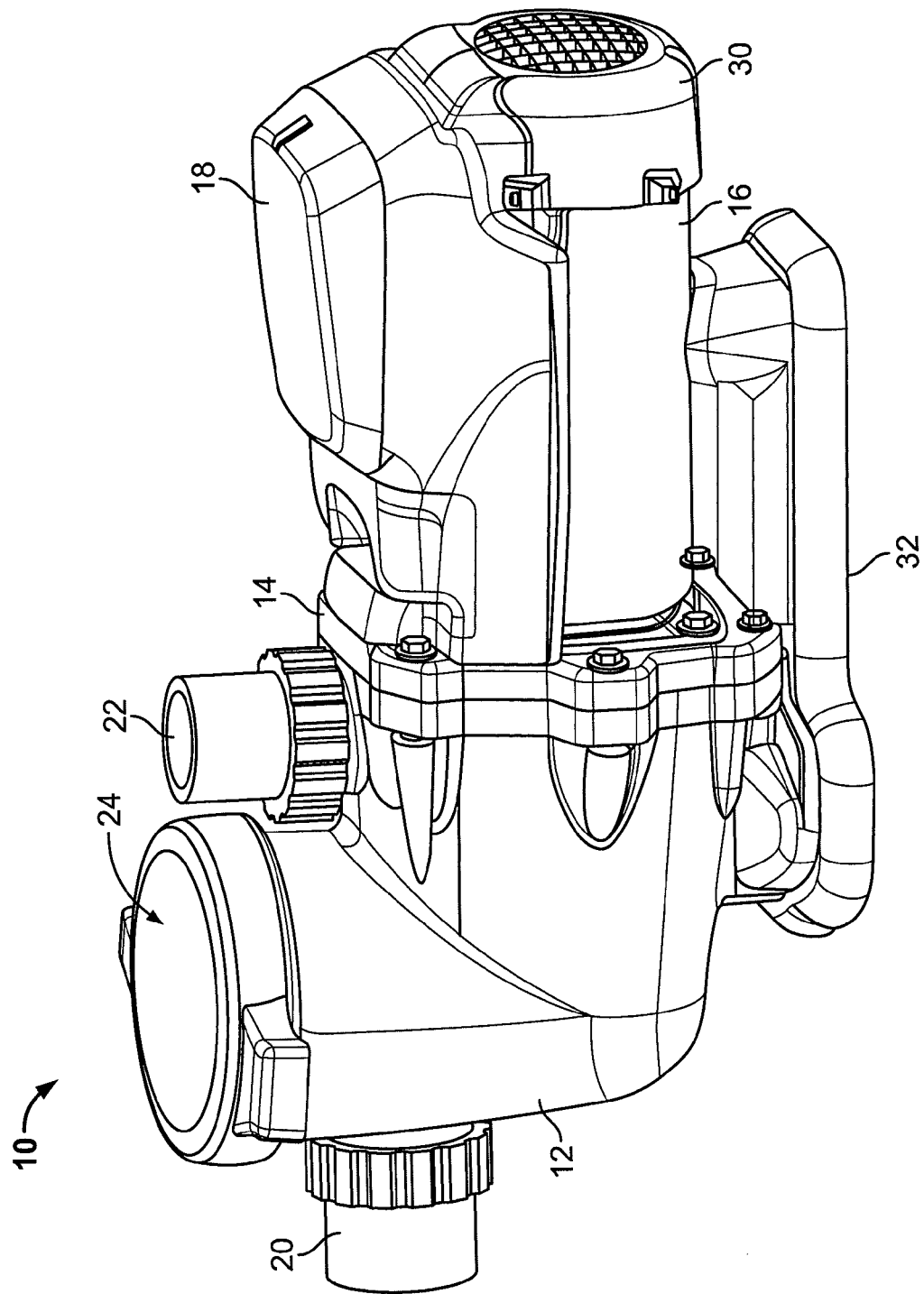
FIG. 1 is a left-side perspective view of an electric water pump assembly that is prior art with respect to the present application, said electric pump assembly including a drive assembly, a motor, a pump, and a sealing plate.
Figure 2:
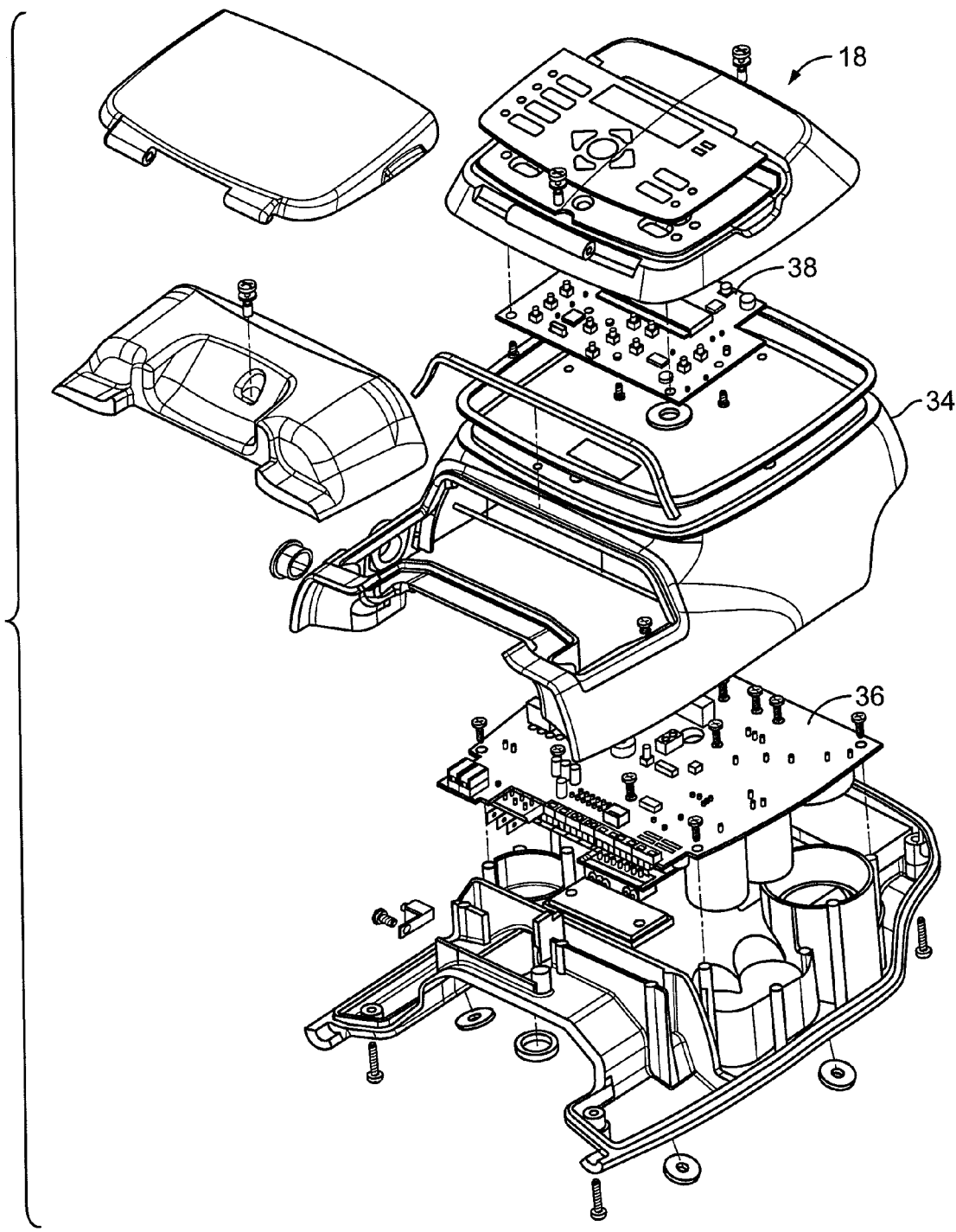
FIG. 2 is a partially-exploded left-side perspective view of the drive assembly of FIG. 1.
Figure 3:
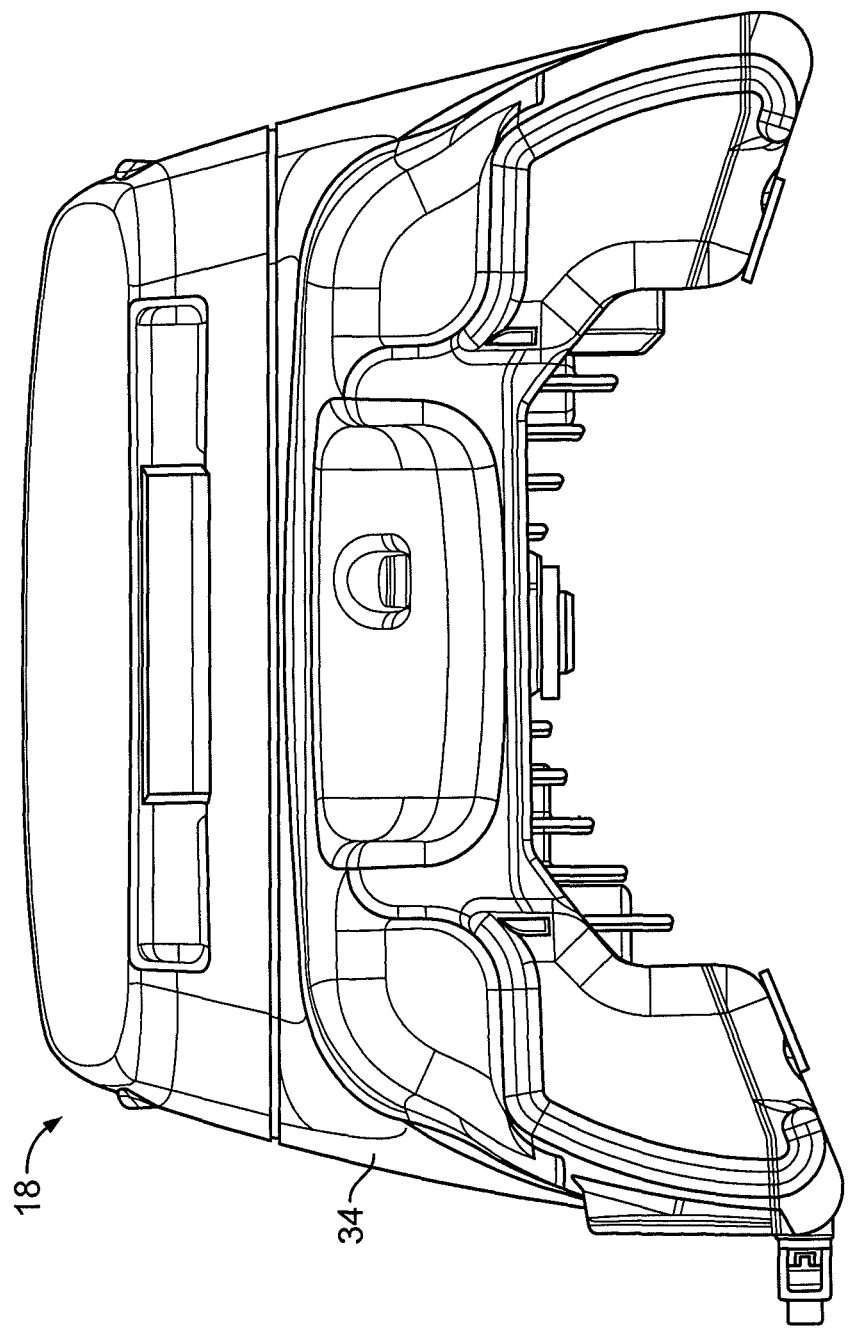
FIG. 3 is a front view of the drive assembly of FIG. 1.
Figure 4:
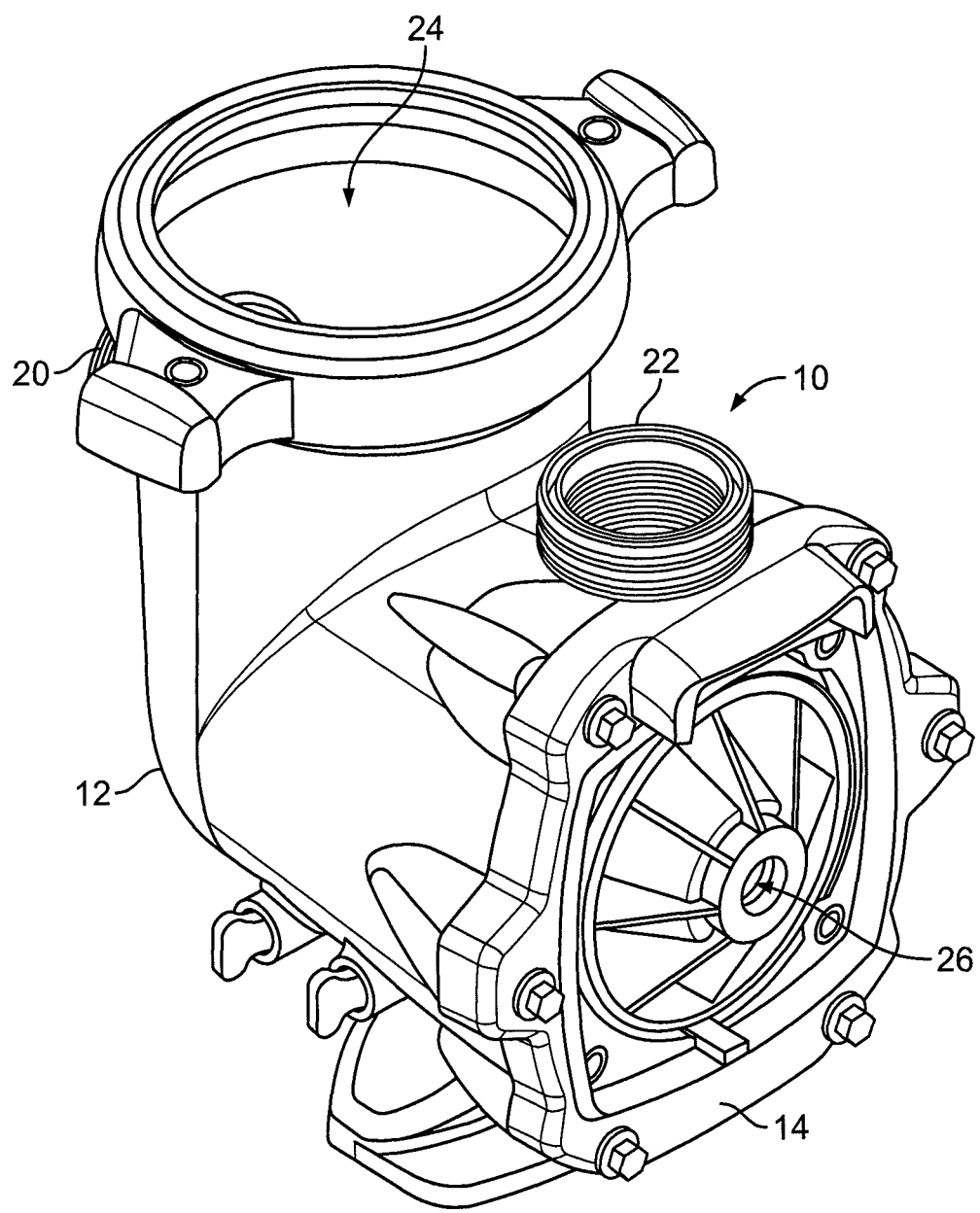
FIG. 4 is a left-side perspective view of the pump and the sealing plate of FIG. 1.
Figure 5:
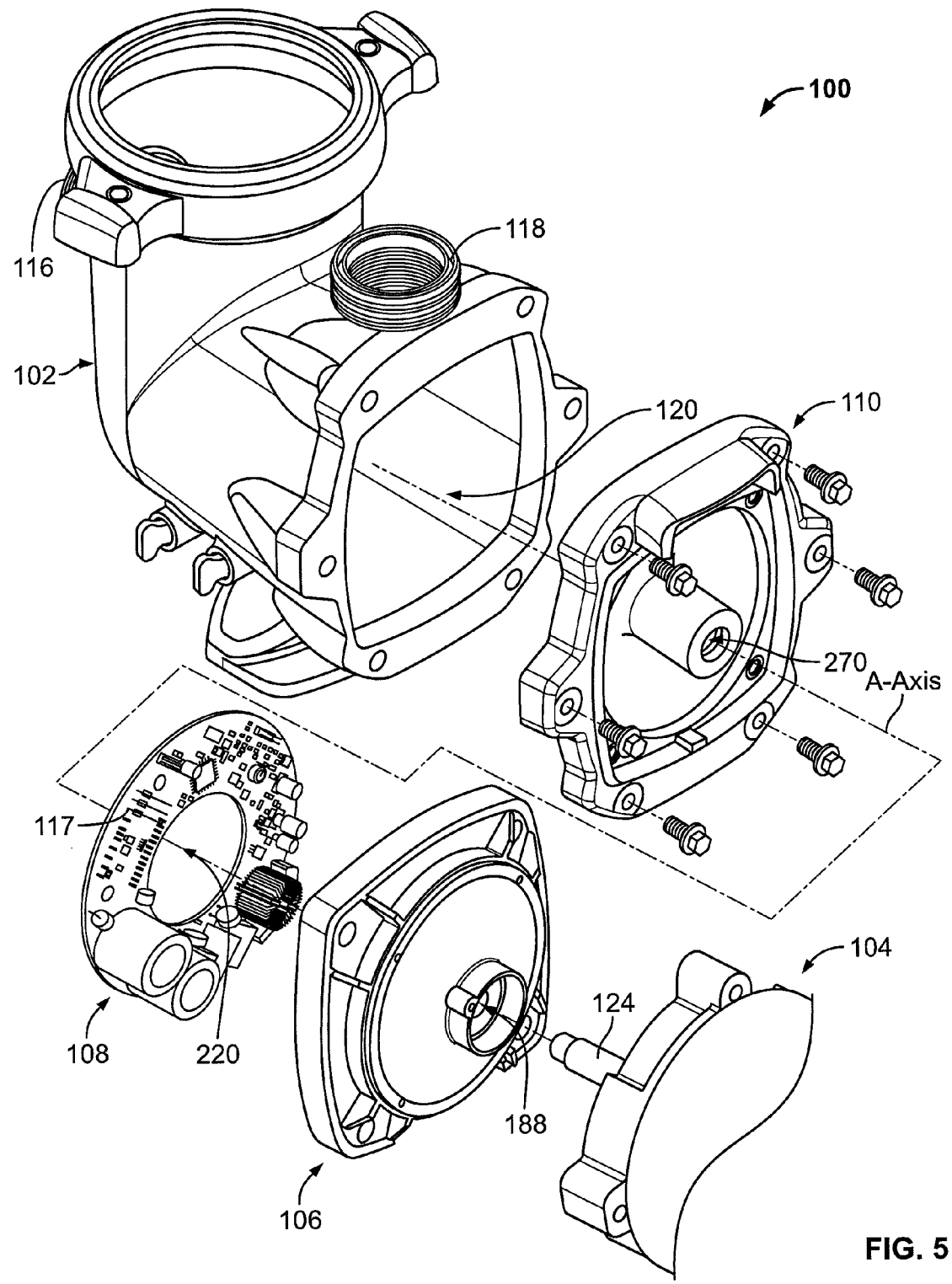
FIG. 5 is a partially-exploded left-side perspective view of a water pump assembly including a water pump, a pump seal plate, an inverter printed circuit board assembly, a motor faceplate, and a motor, constructed in accordance with an exemplary embodiment of the invention.

Referring to FIGS. 5-14, a water pump assembly including a water cooled inverter is shown in accordance with an exemplary embodiment. As shown in FIG. 5, the water pump assembly 100 includes a water pump 102, a pump seal plate 110, an inverter printed circuit board (PCB) assembly 108, a motor faceplate 106, and a motor 104, each of which will be discussed below in detail. The pump 102 includes an inlet 116 directing fluid from the fluid circulation line into the water chamber 120, and an outlet 118 for discharging fluid from the water chamber 120 to the fluid connection line. The pump seal plate 110 has a first surface that houses the inverter printed circuit board assembly and a second surface that contacts the water within the water chamber 120. The pump seal plate 110 is made of a thermally conductive material, and dissipates heat from the PCB assembly 108 into water within the water chamber 120. The water chamber 120 is sized to accommodate a strainer basket for filtering water that flows into the water chamber. Those in the art will appreciate that the pump 102 can be the same as the pump 12 that is incorporated in the pumping assembly 10. Also, the motor 104 can be the same as the motor 16 that is incorporated in the pumping assembly 10. Thus, the disclosed water cooled inverter is compatible with already existing pumps and motors.

It should be well understood that the pump 102 can be any type of pump. For example, the present embodiments can employ centrifugal pumps such as pool pumps, auxiliary pumps, and any other type of water pump with integrated motor/wet-end combination. Also, the motor 104 can be any type of electric motor, such as an induction motor, a permanent magnet motor, a switched reluctance motor, etc. The motor 104 can be a single speed motor, double speed motor, variable speed motor, etc. Also, it will be appreciated by those in the art that any type of inverter PCB assembly 108 can be used while remaining within the scope of the present disclosure. For example, the inverter PCB assembly 108 can have single or multiphase input and/or single or multiphase output.

Figure 6:
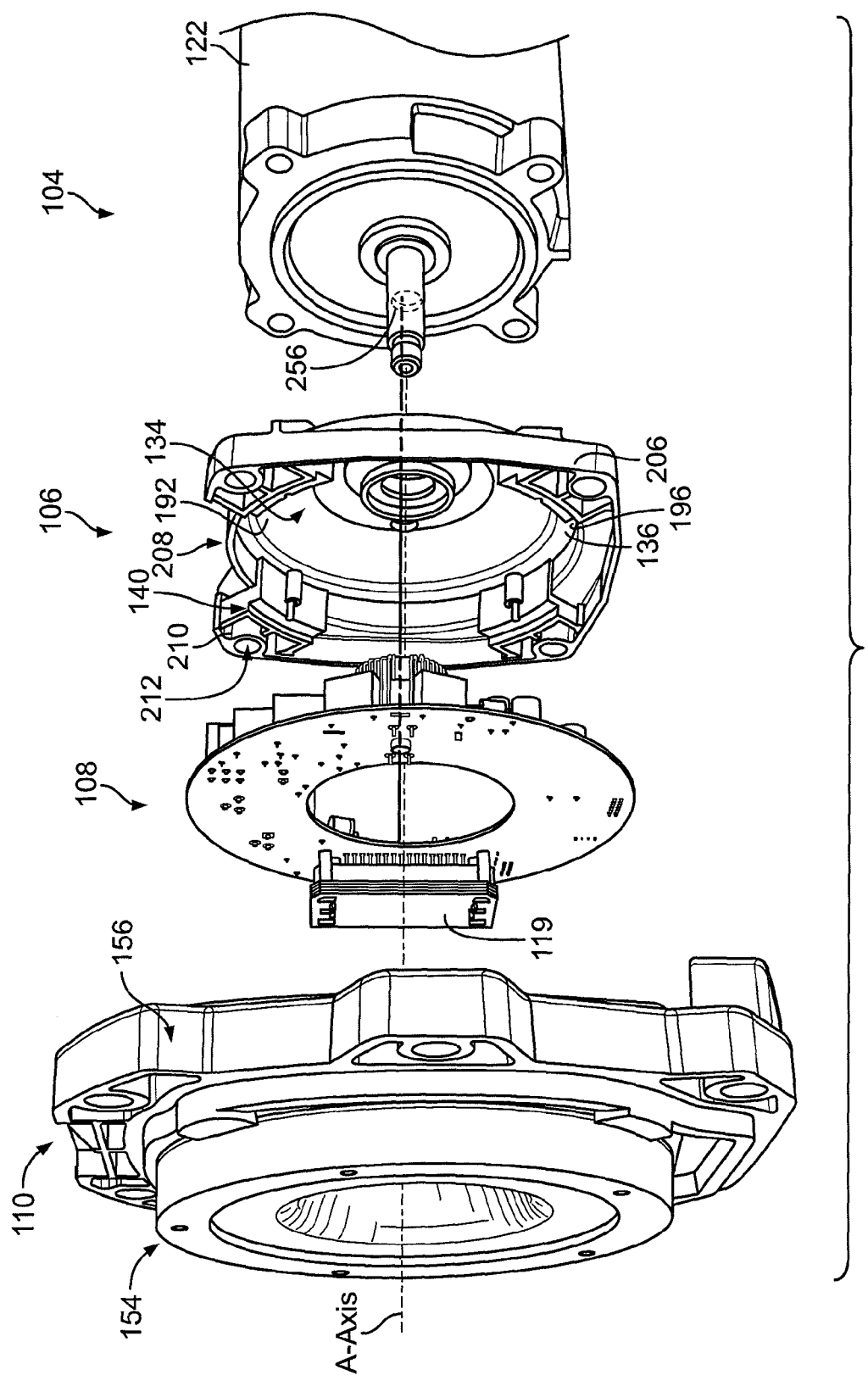
FIG. 6 is a partially-exploded left-side perspective view of the pump seal plate, the inverter printed circuit board assembly, the motor faceplate, and the motor of FIG. 5.
Figure 7:
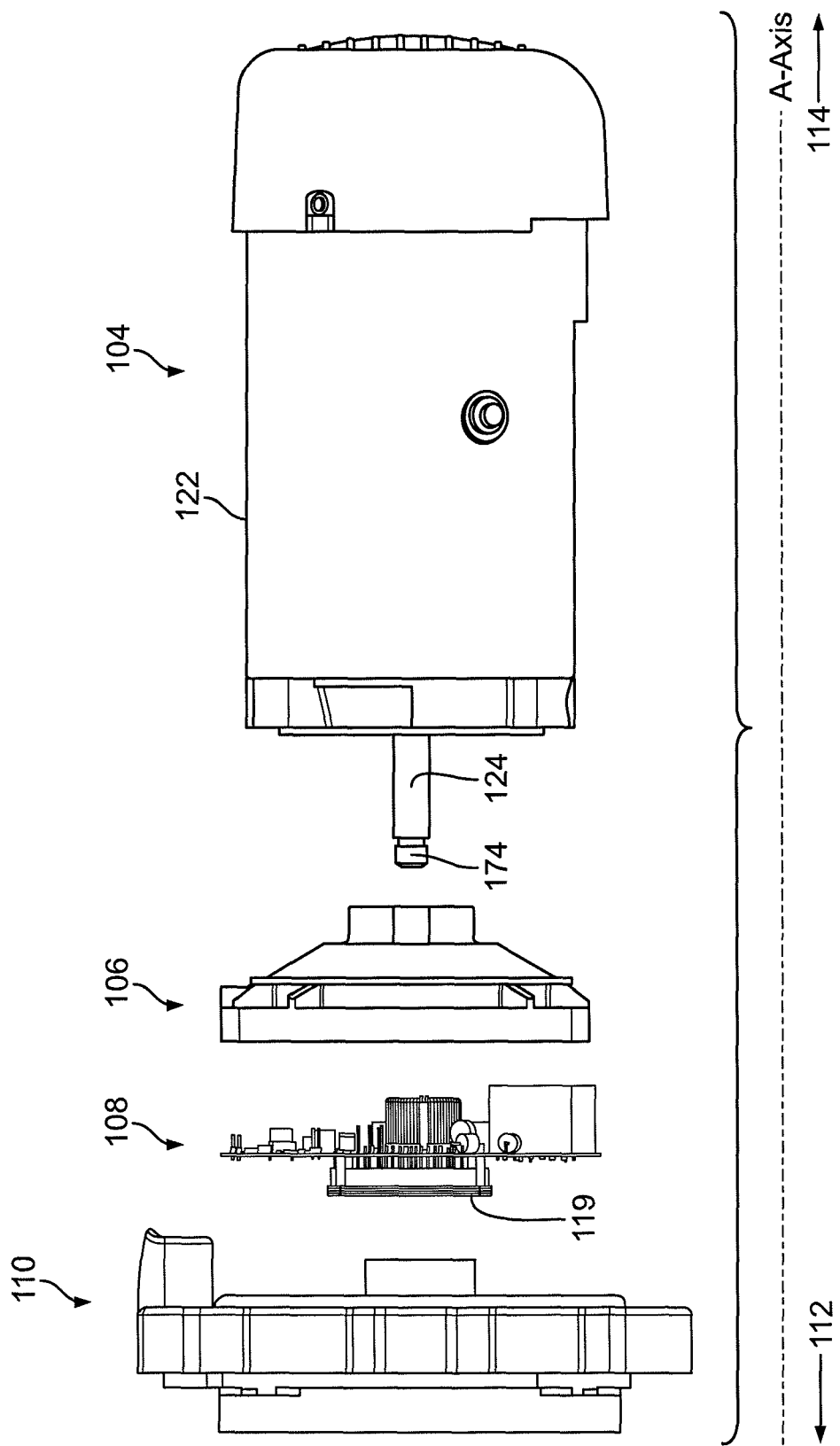
FIG. 7 is a partially-exploded left-side view of the pump seal plate, the inverter printed circuit board assembly, the motor faceplate, and the motor of FIG. 5.

Referring to FIG. 7, the pump assembly 100 extends from a pump end 112 to a motor end 114 along the A-axis. The motor 104 includes a motor body 122, which has a cylindrical shape extending longitudinally along axis-A. A shaft 124 extends from the motor body along axis-A. The shaft 124 includes a threaded end 174 for attaching the impeller thereto. In operation, the shaft 124 protrudes into the water chamber 120 and drives the impeller to pump fluids from the inlet 116, through the water chamber 120 and out the outlet 118 (see FIG. 5). As shown in FIG. 6, the motor body 122 includes a motor body attachment component 256 for providing power to the inverter PCB assembly 108, the details of which will be described in further detail below, Now turning to FIG. 9, the motor faceplate 106 can include a cupped portion 134 comprising a motor side surface 190 having a convex curved shape. In some embodiments, extending around the outer periphery of the cupped portion 134 is a rim 136. The rim 136 can include a rim motor side 194 proximate the cupped portion motor side surface 190. A rim flanged portion 198 can extend outward around the periphery of the rim 136. In some embodiments, extending around at least a portion of the rim 136 is a motor faceplate outer portion 140. The motor faceplate outer portion 140 can include four corners and three sidewalls 206 (see FIG. 8). Thus, the motor faceplate outer portion 140 can include a cut-out region 208 for allowing a portion of the inverter PCB assembly 108 to protrude therethrough.

FIG. 6 shows the impeller side of the motor faceplate 106. As shown, the motor flange 192 of the cupped portion 134 can have a concave shape configured to accommodate the electrical components of the PCB assembly 108. In some embodiments, extending radially outward from the cupped portion 134 is a motor flange 196 of the rim 136. The motor faceplate outer portion 140 can have an impeller side planar surface 210 (referred to herein as the motor faceplate impeller side planar surface) that is configured to engage with the pump seal plate 110, so to house the inverter PCB assembly 108 between the motor faceplate 106 and the pump seal plate 110.

Figure 8:
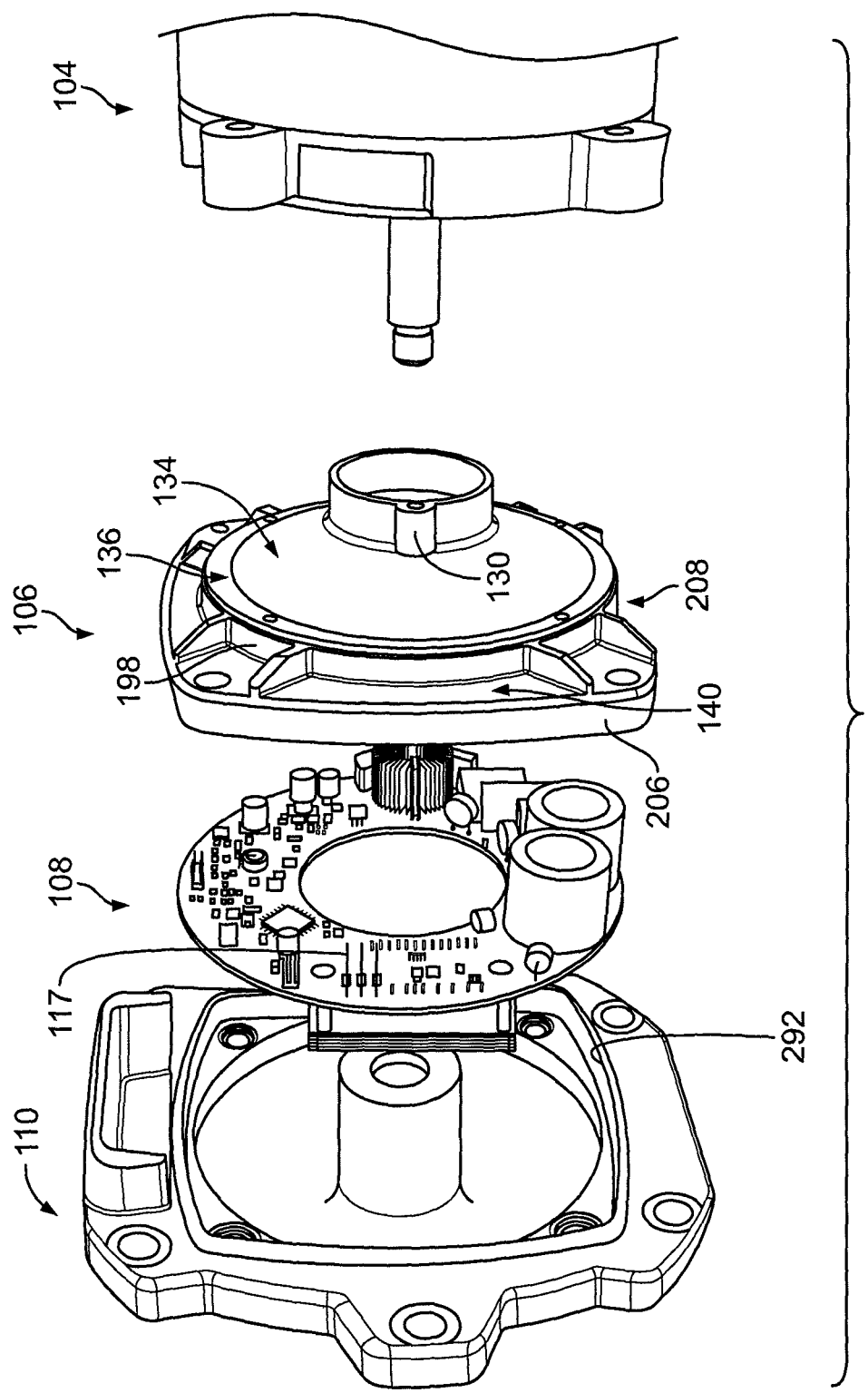
FIG. 8 is a partially-exploded left-side perspective view of the pump seal plate, the inverter printed circuit board assembly, the motor faceplate, and the motor of FIG. 5.

Turning now to FIG. 8, the motor faceplate 106 includes an attachment component 130 for supporting an electrical connection from the motor 104 to the PCB assembly 108. The attachment component 130 can define a channel extending along the A-axis from the motor side of the motor faceplate 106 (see FIG. 8) to the impeller side of the motor faceplate 106 (see FIG. 6). Thus, cables can extend from the motor 104 to the PCB assembly 108 to provide electrical connectivity therebetween. The motor 104 includes a motor attachment component 256 from which the cables extend (see FIG. 6). The PCB assembly 108 includes connectors 117 for receiving the cables and providing power from the cables to the inverter 119 (see FIGS. 6 and 8). When assembled, the motor attachment component 256, the attachment component 130, and the connectors 117 align along the A-axis. Thus, the cables extend from the motor 104, through the motor faceplate attachment component 130, and are received by the connectors 117, and the connectors 117 connect the cables to the inverter output 119 (see FIGS. 6 and 8). As such, the motor 104 can provide the PCB assembly 108 with power.

Figure 10:
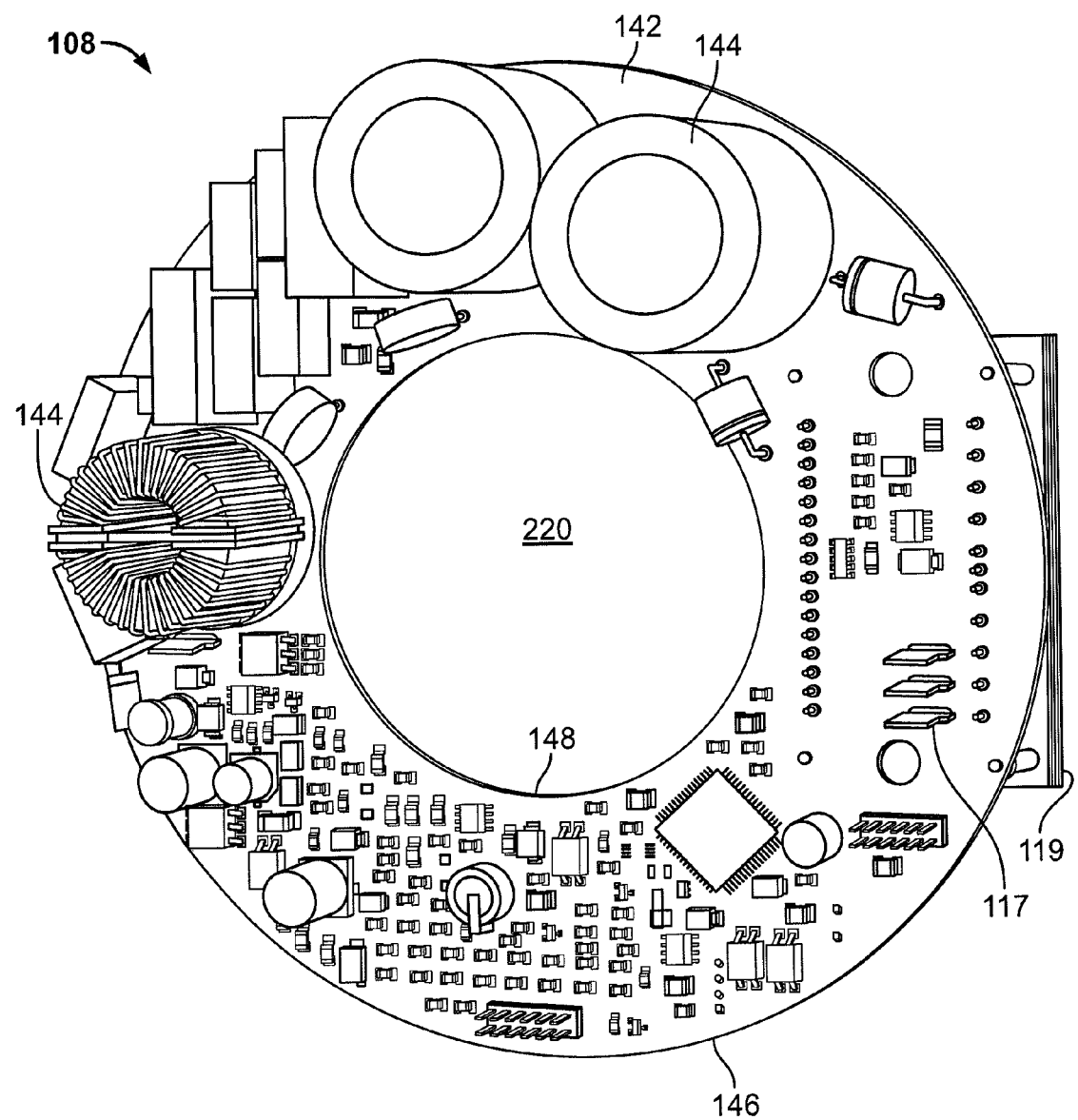
FIG. 10 is a front view of the inverter printed circuit board assembly of FIG. 5.

Turning now to FIG. 10, the inverter PCB assembly 108 includes a PCB 142 and a plurality of electrical components 144, including the inverter output 119 and connectors 117. The inverter PCB 142 includes an outer periphery 146 and an inner periphery 148 defining a PCB aperture 220. The PCB assembly 108 is sized and shaped to fit within the pump seal plate 110 (see, e.g., FIG. 13). It should be well understood that the PCB assembly 108 does not need to have a ring-shape, and the PCB assembly 108 can have any shape while remaining within the scope of the present disclosure.

As shown in FIG. 6, the pump seal plate 110 includes a PCB holding region 154 for accommodating the PCB assembly 108, and a pump seal plate attachment portion 156. At least a portion of the PCB holding region 154 is made of a thermally conductive material. Thus, the pump seal plate 110 transfers heat from the PCB assembly 108 to the water within the chamber 120, while protecting the PCB assembly 108 from water damage (see FIG. 5).

Figure 12:
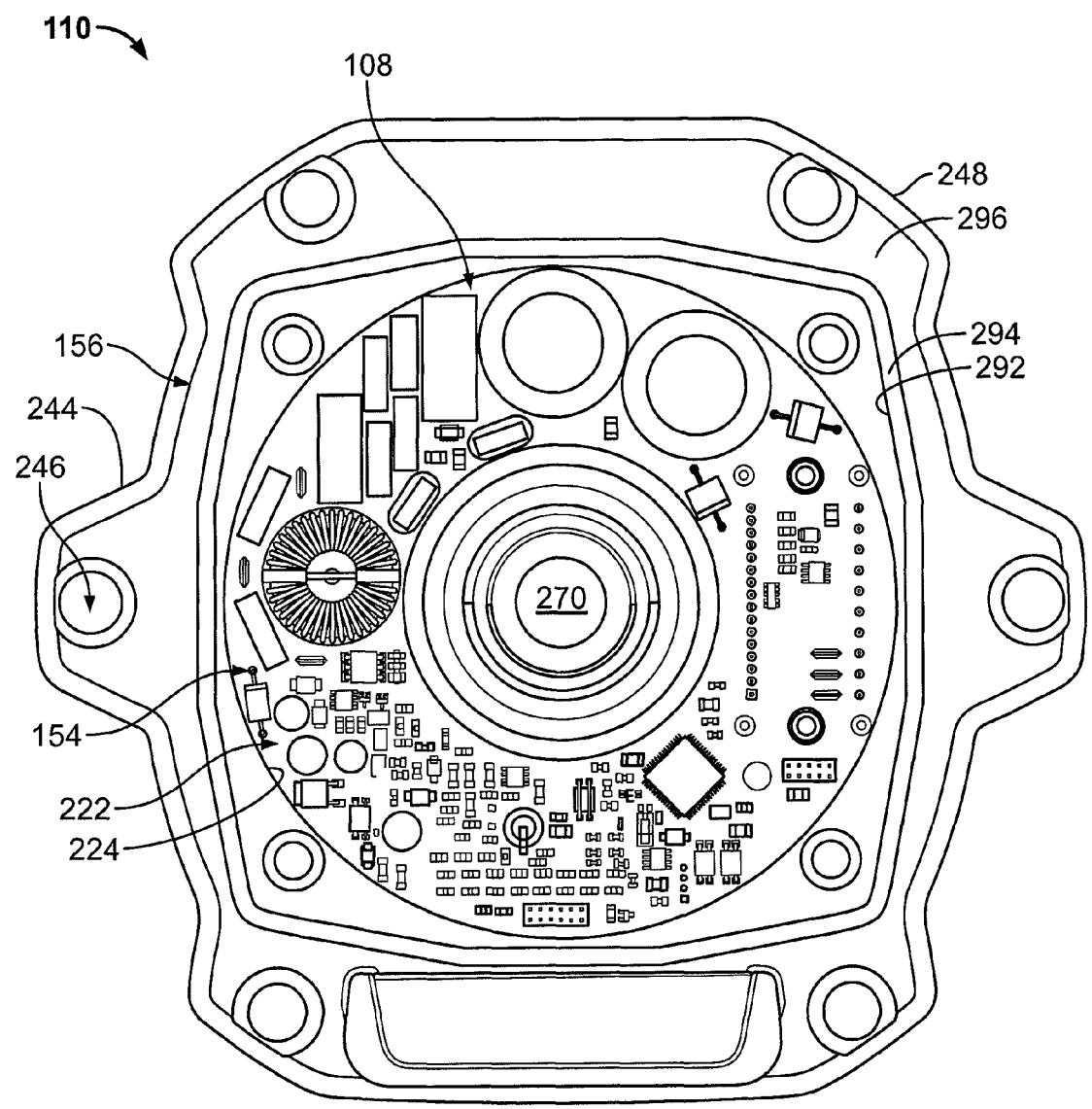
FIG. 12 is a front view of the pump seal plate and the inverter printed circuit board assembly of FIG. 5.

FIG. 12 shows the motor side of the pump seal plate 110 with the PCB assembly 108 disposed therein. The PCB holding region 154 includes a ring-shaped holding chamber 222 comprising a holding region surface 268 (see FIG. 14), and a holding chamber peripheral wall 224. The circumference of the holding chamber peripheral wall 224 is slightly larger than the PCB assembly outer periphery 146, such that the PCB assembly 108 is secured within the holding chamber 222.

Figure 13:
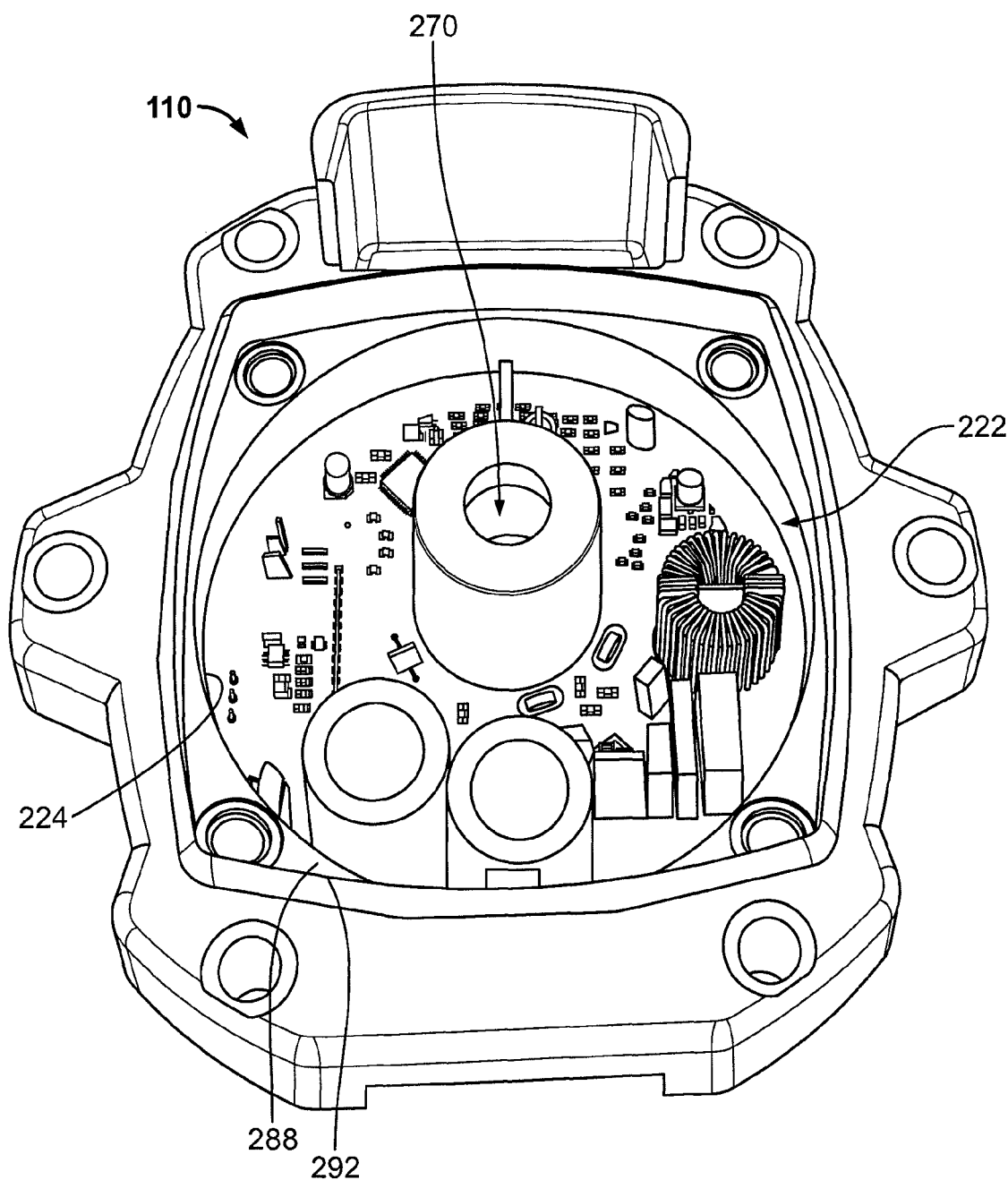
FIG. 13 is a bottom perspective view of the pump seal plate and the inverter printed circuit board assembly of FIG. 5.
Figure 14:
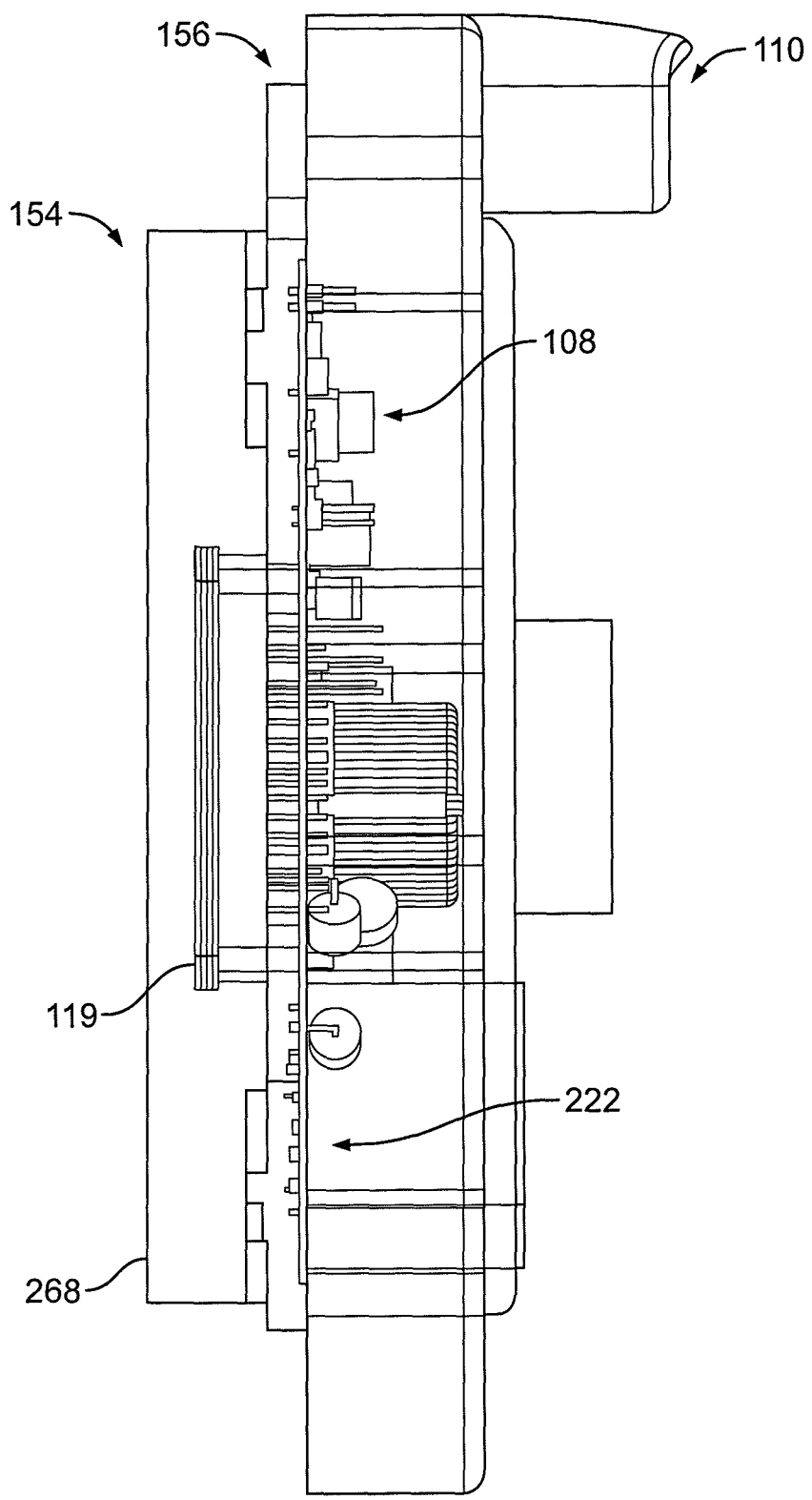
FIG. 14 is a left-side view of the pump seal plate and the inverter printed circuit board assembly of FIG. 5.

As shown in FIG. 13, the motor side of the pump seal plate 110 includes a square-like region (referred to herein as the pump seal plate square-like region), which comprises a pump seal plate attachment surface 288. The pump seal plate attachment surface 288 has a circular inner periphery defined by the holding chamber peripheral wall 224, and a square-like pump seal plate peripheral wall 292.

FIG. 12 shows the attachment portion 156 of the pump seal plate 110 when viewed from the motor end. In some embodiments, a pump seal plate raised edge 294 can extend from the pump seal plate peripheral wall 292 to a pump seal plate motor side attachment surface 296. A pump seal plate outer peripheral wall 248 can extend around the pump seal plate 110. The outer peripheral wall 248 could include one or more ribs extending therefrom (not shown). The pump seal plate attachment portion 156 can includes outer protrusion 244, each having a pump seal plate outer attachment hole 246 therethrough. Thus, attachment means, such as bolts, can extend through the pump seal plate outer attachment holes 246 and through corresponding holes on the pump 102, thereby sealing the pump seal plate 110 onto the pump 102 (see FIG. 5).

Figure 11:
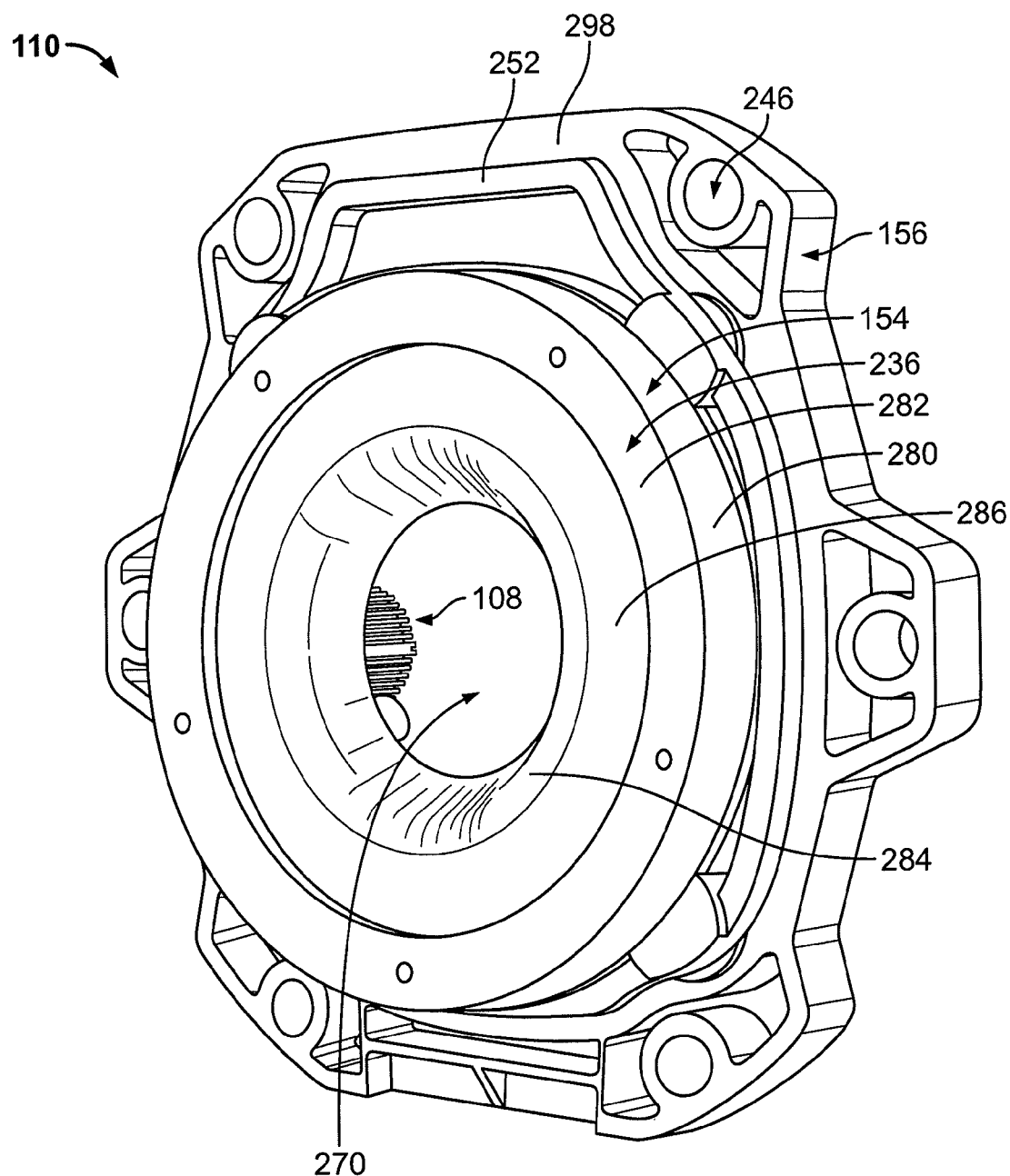
FIG. 11 is a rear perspective view of the pump seal plate and the inverter printed circuit board assembly of FIG. 5.

FIG. 11 shows the pump seal plate 110 containing the PCB assembly 108, as seen from the impeller end of the pump assembly 100. In some embodiments, the PCB holding region 154 includes a holding region ring 236 having a holding region ring planar surface 282, and a holding region ring outer periphery 280. In some embodiments, extending radially inward from the holding region ring 236 is a holding region inner peripheral step 286. Extending radially inward from the holding region inner peripheral step 286 is a holding region conical periphery 284, which defines the pump seal plate aperture 270. The pump seal plate attachment portion 156 can include a pump seal plate stepped portion 252, and a pump seal plate impeller side attachment surface 298.

As shown in FIG. 5, when assembled, the pump 102, pump seal plate 110, inverter PCB assembly 108, motor faceplate 106, and motor 104 align along the A-axis. The pump seal plate 110, the PCB assembly 108, and the motor faceplate 106 have corresponding apertures (270, 220, and 188, respectively) that, in the assembled position, align along the A-axis. Thus, the motor shaft 124 extends through the motor faceplate aperture 188, the PCB assembly aperture 220, the pump seal plate aperture 270, and the into the pump water chamber 120. When assembled, the PCB assembly 108 is protected from exposure to the water in the water chamber 120 by way of a watertight arrangement.

Figure 9:
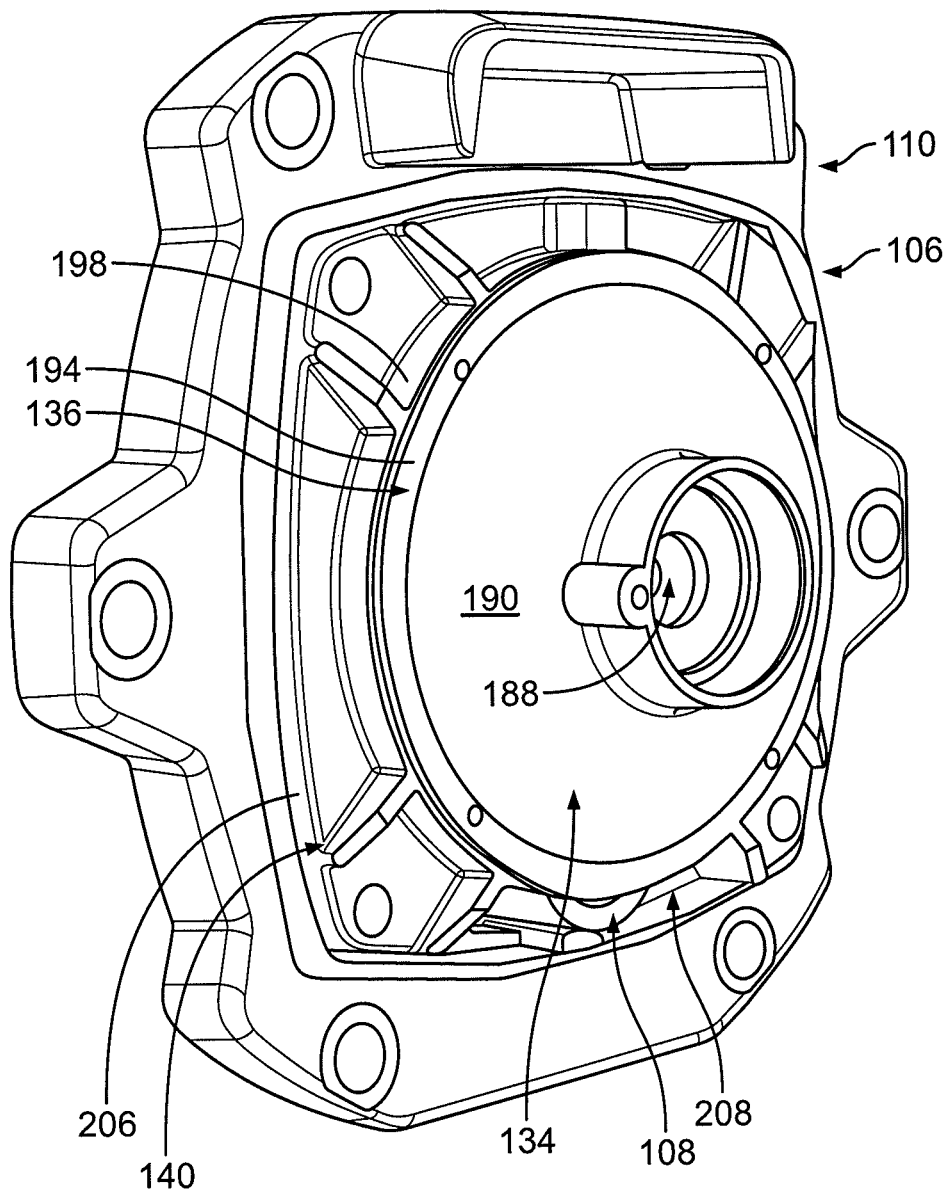
FIG. 9 is a left-side perspective view of the pump seal plate and the motor faceplate of FIG. 5.

Referring to FIGS. 6, 9 and 13, a compact engagement is maintained between the pump seal plate 110 and the motor face plate 106, with the PCB assembly 108 secured therebetween. The outer periphery of the motor faceplate 106 is sized slightly smaller than the pump seal plate peripheral wall 292, such that the pump seal plate peripheral wall 292 abuts the three motor faceplate sidewalls 206. The pump seal plate holding chamber 222 is configured to accommodate electrical components 144 protruding from inverter side of the inverter PCB 142 (see FIGS. 12-14), and the motor faceplate cut-out portion 208 is configured to accommodate electrical components 144 protruding from the motor side of the inverter PCB 142 (see FIGS. 6 and 9). As such, the disclosed embodiments can hold all of the electrical components 144 needed for the inverter PCB assembly 108 and adds only minimal, if any, spatial volume to the pump assembly 100.

The pump seal plate 110 is made of a thermally conductive material so to thermally couple the inverter PCB assembly 108 to the water within the water chamber 120 (see, e.g., FIG. 5). Thus, the pump seal plate 110 serves as a heat sink, transferring heat from the PCB assembly 108 to the water chamber 120. All of the pump seal plate 110 or a portion of the pump seal plate 110 (e.g., the PCB holding region 154) is made of a thermally conductive material that provides thermal communication from the inverter PCB assembly 108 to the water in the water chamber 120. Thus, at least a portion of the pump seal plate 110 transfers heat from the pump seal plate holding chamber 222 on the motor side of the pump seal plate 110 to the impeller side of the pump seal plate 110. For example, at least one of the holding region ring 236, holding region inner peripheral step 286, or the holding region conical periphery 284 can be made of a thermally conductive material (see FIG. 11). Further, if the pump seal plate 110 includes one or more ribs extending from an outer periphery 248 thereof, the ribs could further dissipate heat to the external environment (e.g., by increasing the external surface area of the pump seal plate 110).

This could be particularly advantageous if water stops flowing through the water pump 102 but the PCB 108 continues to operate and generate heat.

In some embodiments, some of or all of the PCB holding region 154 of the pump seal plate 110 is made of the thermally conductive material, while the attachment portion 156 is made of a non-thermally conductive material. In some embodiments, the entire pump seal plate 110 is made of the thermally conductive material. Other components besides the pump seal plate 110 (e.g., at least a portion of the pump 102; at least a portion of the motor faceplate, etc.) can be made of the thermally conductive material.

The thermally conductive material can comprise any one or more thermally conductive materials. For example, at least a portion of the pump seal plate 110 can be made of a metallic material, such as aluminum, galvanized aluminum, and/or bronze. Additionally or alternatively, at least a portion of the pump seal plate 110 can be made of a material including a polymer and/or a plastic, strong enough to withstand water chamber pressure. For example, at least a portion of the pump seal plate 110 can be made of a material comprising a polymer embedded within a plastic. For example, at least a portion of the pump seal plate 110 can be made of a composite material comprising a polymer and a plastic. In some embodiments, different portions of the pump seal plate 110 are made of various thermally conductive materials.

As will be appreciated by those in the art, the present embodiments allow the inverter PCB assembly 108 to be cooled by the water within the water chamber 120 without exposing the PCB assembly 108 to the water itself. In operation, heat produced by the inverter PCB assembly 108 is transferred into the pump seal plate 110, through the engagement between the inverter PCB assembly 108 and the pump seal plate 110. Because the pump seal plate 110 is adjacent to flowing water on the opposite side with respect of where the inverter PCB assembly 108 is installed, the heat is transferred to the flowing water which allows the inverter PCB assembly 108 to be cooled to retain its performance. The present embodiments improve water cooled based pump priming by allowing the inverter PCB assembly 108 to be cooled even when the water chamber 120 is partially filled. In contrast, the typical bypass/separate heatsink based cooling systems rely on coolant water flow in the bypass which is not present in an unprimed pump.

It will be appreciated that the improved configuration does not require the larger inverter assembly as found in the prior art assembly of FIGS. 1-4, as the seal plate 110, PCB assembly 108, and motor faceplate 106 encompass minimal, if any, added volume as compared to the previous seal plate 14.

As explained, the embodiments herein disclosed are based on the alternate location for the inverter PCB assembly, namely, between the motor 104 and the wet end of the pump seal plate 110. This location brings the benefit of the ability to cool the power electronics components directly through the wall (e.g., the pump seal plate 110) that separates the water chamber 120 from the motor faceplate 106. Thus, such wall becomes an active heatsink in embodiments of the present disclosure. With this improved construction, there is no need for additional "waterways" to deliver coolant to a separate actual heatsink area which needs to be cooled. Thus, this simplified design can be provided and maintained at a lower cost. The disclosed embodiments also enable design of a highly efficient water cooler for inverter driven electric motor water pumps. Also, the disclosed embodiments simplify mechanical design of the water cooled inverter based electric water pump combination. Also, the disclosed embodiments reduce the cost of inverter driven electric water pumps, for example, through the reduced size of the inverter heatsink and the elimination of the separate inverter heatsink. Further, the disclosed embodiments improve pump priming efficiency.

It is preferable that the inverter PCB assembly fit all inverter components that are on the board, though the inverter PCB assembly 108 need not be a "donut" shape. In some embodiments, the pump is up to 1.9 horsepower, and the inverter is scaled accordingly. Further, the inverter PCB can be used for driving AC induction motors and/or brushless DC (BLDC) motors and a total enclosed fan cooled (TEFC) motor open frame motor. Further, a top side Display/Logic connector location provides design friendly display module interfacing. The motor connection can be made directly to the inverter PCB, such that there are no exposed wires that would have to be concealed.

Thus the present disclosure provides advantageous water pump designs and assemblies for use in fluid systems (e.g., fluid circulation systems). Although the systems, assemblies and methods of the present disclosure have been described with reference to exemplary embodiments thereof, the present disclosure is not limited to such exemplary embodiments and/or implementations. Rather, the systems, assemblies and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure.

What is claimed is:

1. A water cooled inverter for attachment to a water pump housing that defines a water chamber therewithin, the water cooled inverter comprising:
   a pump seal plate, including a sealing wall that has a pump seal plate aperture therethrough, the pump seal plate aperture configured to receive a motor shaft to allow an impeller coupled to the motor shaft to propel water within the water chamber; and
   an inverter assembly, wherein the pump seal plate thermally couples the inverter assembly to the water chamber.

2. The water cooled inverter of claim 1, the sealing wall including a first sealing wall surface and a second sealing wall surface wherein, when the water cooled inverter is attached to the water pump housing, the first sealing wall surface contacts the water chamber and the second sealing wall surface is proximate the inverter assembly.

3. The water cooled inverter of claim 1, wherein, when the water cooled inverter is attached to the water pump housing, at least a portion of the sealing wall dissipates heat from the inverter assembly to the water chamber.

4. The water cooled inverter of claim 1, wherein at least a portion of the pump seal plate is made of a thermally conductive material.

5. The water cooled inverter of claim 1, further comprising a motor faceplate, the inverter assembly positioned between the pump seal plate and the motor faceplate.

6. The water cooled inverter of claim 1, the inverter assembly comprising a ring-shaped printed circuit board that includes an inverter assembly aperture therethrough.

7. The water cooled inverter of claim 6, wherein the inverter assembly aperture is aligned with the pump seal plate aperture and is configured to receive the motor shaft.

8. The water cooled inverter of claim 4, wherein the thermally conductive material comprises at least one of a metal or a polymer.

9. The water cooled inverter of claim 1, wherein the water cooled inverter is part of a water pump assembly that further comprises at least one of a water pump housing or a motor that includes the motor shaft and the impeller.

10. A water pump assembly comprising,
   a water pump housing that defines a water chamber therewithin, the water pump housing including an inlet and an outlet, the inlet being fluidly coupled to the outlet via the water chamber, and a water chamber opening;
   a pump seal plate comprising a sealing wall, the sealing wall including a first seal plate surface that blocks at least a portion of the water chamber opening and a second seal plate surface, the sealing wall having a pump seal plate aperture extending from the first seal plate surface to the second seal plate surface;
   a motor faceplate attached to the second seal plate surface;
   an inverter assembly positioned between the pump seal plate and the motor faceplate, the inverter assembly being thermally coupled to the water chamber by way of the pump seal plate; and
   a motor comprising a motor shaft and an impeller attached thereto, wherein the motor shaft extends through the pump seal plate aperture.

11. The water pump assembly of claim 10, wherein at least a portion of the sealing wall comprises a thermally conductive material.

12. The water pump assembly of claim 10, wherein at least a portion of the sealing wall dissipates heat from the inverter assembly to the water chamber.

13. The water pump assembly of claim 10, wherein the pump seal plate, the motor faceplate, and the motor form a watertight seal between the water chamber and the inverter assembly.

14. The water pump assembly of claim 10, wherein the motor faceplate provides electrical connectivity between the inverter assembly and the motor.

15. The water pump assembly of claim 10, wherein the inverter assembly comprises a ring-shaped printed circuit board that includes an inverter assembly aperture therethrough.

16. The water cooled inverter of claim 15, wherein the inverter assembly aperture is aligned with the pump seal plate aperture and is configured to receive the motor shaft.

17. The water cooled inverter of claim 11, wherein the thermally conductive material comprises at least one of a metal or a polymer.

* * * * *